UNITED STATES PATENT OFFICE.

CAROLINE WEISSER, OF LOS ANGELES, CALIFORNIA.

HAIR-TONIC.

SPECIFICATION forming part of Letters Patent No. 247,720, dated September 27, 1881.

Application filed July 15, 1881. (No specimens.)

*To all whom it may concern:*

Be it known that I, CAROLINE WEISSER, of Los Angeles, county of Los Angeles, and State of California, have invented a new and Improved Hair-Restorer, of which the following is a specification.

My composition consists of the following ingredients: To one pint of soft water are added one ounce of dried olive-leaves, one ounce of marjoram-leaves, one ounce of marjoram-roots, and then this water is slowly boiled down to about one-half a pint; then cooled and strained. One ounce of glycerine and twenty drops of perfumery oil are added, this oil preferably consisting of ten drops of oil of cloves and ten drops of bergamot-oil.

The head is washed in the morning and at night with the above-described compound. Thereby the hair is strengthened and invigorated, and the formation of dandruff is avoided.

Having thus described my invention, I claim as new and desire to secure by Letters Patent—

The within-described composition of matter to be used as a hair-restorer, and consisting of a decoction of dried olive-leaves, marjoram-leaves, marjoram-roots, and of glycerine, in the proportions specified.

CAROLINE WEISSER.

Witnesses:
EVA N. HOLT,
AMELIA W. MCCRADY.